United States Patent [19]

Green

[11] 3,868,519

[45] Feb. 25, 1975

[54] DATA TRANSMISSION SYSTEMS AND COMPONENTS THEREFOR

[76] Inventor: Douglas Green, 33 Wansheck Ave., North Shields, England

[22] Filed: May 9, 1973

[21] Appl. No.: 358,805

[30] Foreign Application Priority Data

May 11, 1972 Great Britain .................... 22174/72

[52] U.S. Cl. ................. 307/270, 307/228, 307/261, 307/263, 307/268, 328/35, 328/36

[51] Int. Cl. .......................... H03k 1/12, H03k 4/50

[58] Field of Search ........... 307/208, 228, 261–263, 307/268, 270, 313; 328/35, 36

[56] References Cited

UNITED STATES PATENTS

| | | | |
|---|---|---|---|
| 3,329,835 | 7/1967 | D'Agostino | 307/218 X |
| 3,381,089 | 4/1968 | Delanoy et al. | 307/208 X |
| 3,444,394 | 5/1969 | Colvson | 307/261 |

*Primary Examiner*—John Zazworsky
*Attorney, Agent, or Firm*—Kirchstein, Kirchstein, Ottinger & Frank

[57] ABSTRACT

A data transmission system wherein digital data pulses are transmitted along a balanced pair transmission line as respective signals on the two lines which have complementary waveforms of substantially trapezoidal shape.

8 Claims, 5 Drawing Figures

DATA TRANSMISSION SYSTEMS AND COMPONENTS THEREFOR

This invention relates to data transmission systems and to line driver and line receiver circuits for use therein.

The waveform of the signal used to transmit digital data along a transmission line in a data transmission system becomes important at higher bit rates. A rectangular waveform enables high bit rates to be achieved but causes a high level of electromagnectic radiation from the transmission line. Smooth waves such as sinusoidal shapes minimize electromagnetic radiation but reduce the maximum bit rates.

It is an object of the present invention to provide a data transmission system wherein this difficulty is alleviated.

According to one aspect of the present invention there is provided a data transmission system wherein digital data pulses are transmitted along a balanced pair transmission line as respective signals on the two lines which have complementary waveforms of substantially trapezoidal shape.

According to a second aspect of the invention there is provided a line driver circuit, for use in a data transmission system according to the invention, having a single input and first and second outputs, the circuit being responsive to a signal on its input of substantially rectangular waveform to develop simultaneously at its output signals of complementary waveforms of substantially trapezoidal shape.

A preferred line driver circuit in accordance with the invention comprises an integrated constant current source connected with the input of the circuit so as to be active in one state only of the two states of a rectangular waveform signal applied to the input, thereby to produce an output current of trapezoidal waveform, and means for producing complementary singnals at the output of the circuit corresponding to the output current of the constant current source.

According to a third aspect of the invention there is provided a line receiver circuit for use in a data transmission system according to the invention, having first and second inputs and an output, the circuit being responsive to respective signals at its inputs of complementary waveforms of substantially trapezoidal shape to develop at its output a signal of substantially rectangular waveform.

A preferred line receiver circuit in accordance with the invention comprises first and second amplifying arrangements which exhibit hysteresis type input/output characteristics and whose inputs are respectively connected to said first and second inputs of the circuit; and a logic gate via which the outputs of the amplifying arrangements are connected to the output of the circuit.

One data transmission system in accordance with the invention will now be described, by way of example, with reference to the accompanying drawings in which FIG. 1 is a diagram of the system;

Figure 1:
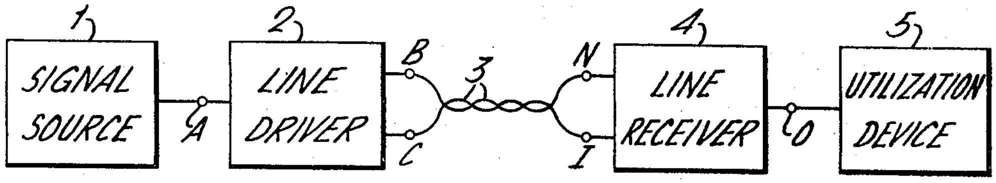

Referring the FIG. 1, the system comprises a source 1 of digital data signals of rectangular waveform whose output is supplied to the input A of a line driver circuit 2 having two outputs B and C, the driver circuit 2 being responsive to the signal at its input A to develop simultaneously at its outputs B and C respectively signals of complementary waveform of trapezoidal shape.

The outputs B and C are respectively connected to the ends of the lines 3 of a balanced pair transmission line which is conveniently in the form of a twisted pair of lines. The other ends of the lines 3 are respectively connected to first and second inputs I and N of a line receiver 4, the receiver 4 being responsive to complementary trapezoidal waveform signals at its inputs I and N to develop at its output O a signal of substantially rectangular waveform. The output O of the receiver 4 is applied to a utilization device 5, for example, a computer.

Figure 2:
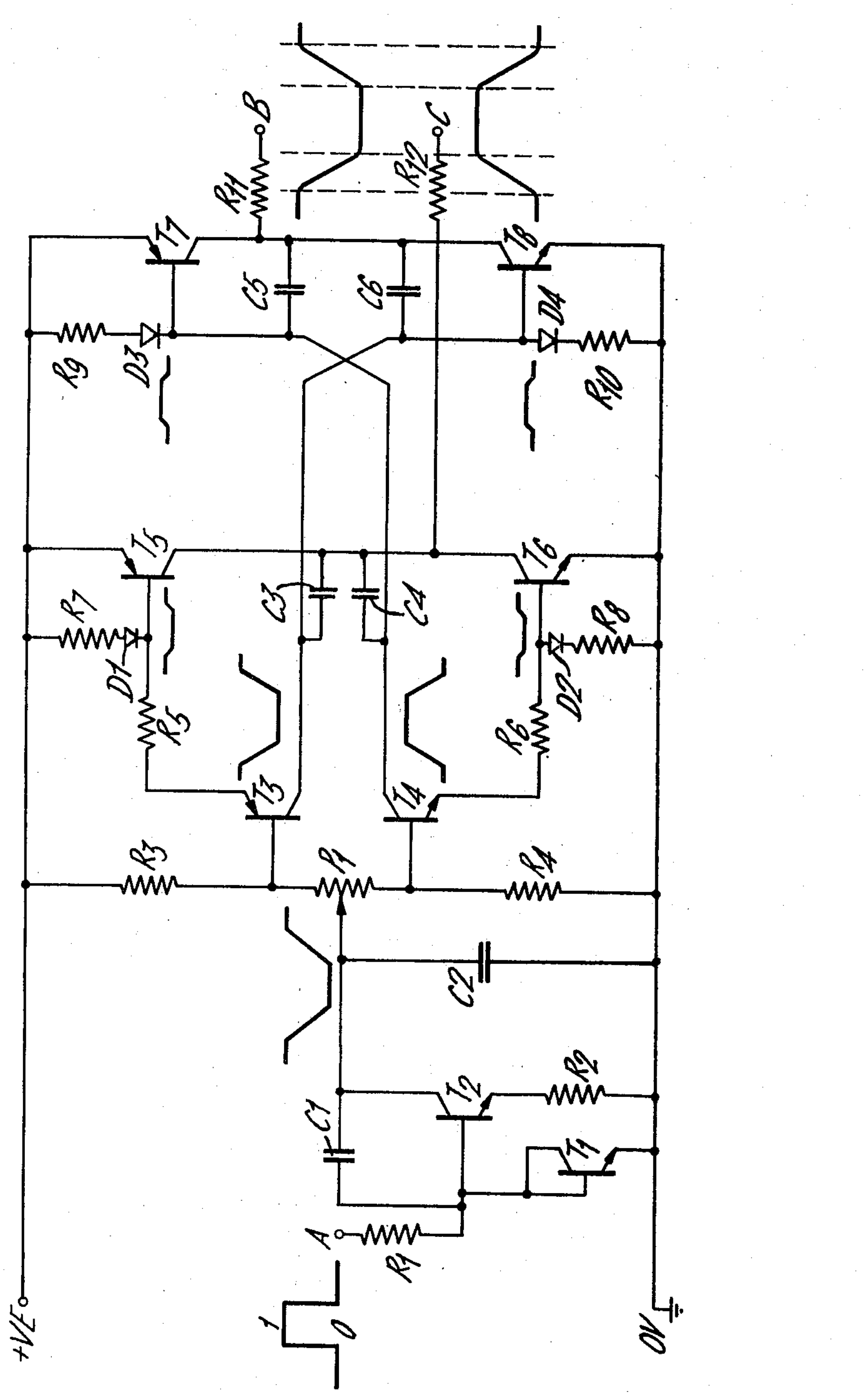
FIG. 2 is a circuit diagram of a line driver for use in the system.

A suitable circuit for the line driver 2 of FIG. 1 is shown in FIG. 2. In this circuit the input A is connected via a resistor R1 to the base of an NPN transistor T2 whose emitter is connected via a resistor R2 to ground. The base of the transistor T2 is further connected to the base and collector of an NPN transistor T1 whose emitter grounded. A capacitor C1 is connected between the base and collector of transistor T2 and the collector is further connected to the tapping point of a potentiometer P1 one end of which is connected via a resistor R4 to ground and the other end of which is connected via a resistor R3 to a positive voltage supply line Vcc.

The junction between the potentiometer and resistor R3 is connected to the base of a PNP transistor T3 whose collector is connected to ground via a resistor R10 and whose emitter is connected to the positive line Vcc via two series connected resistors R5 and R7.

The junction between the potentiometer P1 and resistor R4 is connected to the base of an NPN transistor T4 whose collector is connected to the positive line Vcc via a resistor R9 and whose emitter is connected to ground via two series connected resistors R6 and R8.

The junction between the resistors R5 and R7 is connected to the base of a PNP transistor T5 whose emitter is connected to the positive line Vcc. The junction between the resistors R6 and R8 is connected to the base of an NPN transistor T6 whose emitter is grounded. The collectors of the transistors are connected together and via a resistor R12 to the output C of the circuit.

The output B of the circuit is similarly derived via a resistor R11 from the collectors of a PNP transistor T7 and a NPN transistor T8 whose emitters are respectively connected via resistors R9 and R10 to the line Vcc and ground, and directly to the collectors of transistors T4 and T3.

In operation of the circuit a low or high positive voltage is applied to input A corresponding to a logic '0' and a logic '1' respectively.

In the low voltage input state transistors T1 and T2 are biassed off so that the voltages at the bases of the transistors T3 and T4 are defined by the potential divider formed by resistors R3 and R4 and potentiometer P1. This divider is arranged so that the collector current of transistor T3 is low and transistors T5 and T8 are consequently biassed off, and so that the collector current of transistor T4 is high and transistors T6 and T7 are consequently biassed on. Hence, in the low voltage input state output B assumes an open circuit voltage substantially equal to that of line Vcc and output C assumes an open circuit voltage of substantially zero volts.

When the voltage at input A changes from its lower value to its higher value a constant current flows through the resistor R1 linearly discharging capacitor C1. The transistors T1 and T2 with resistors R1 and R2 thus act as an integrated constant current source connected between ground and the tapping point of potentiometer P1. The resulting potential change at the base of transistor T3 causes the collector current of transistor T3 to change linearly from a low level to a high level. Transistors T5 and T8 consequently change from a non-conducting state through a linear state into a saturated state.

At the same time the resulting potential change at the base of transistor T4 causes the collector current of transistor T4 to change linearly from a high level to a low level. The transistors T6 and T7 consequently change from a saturated state through a linear state into a non-conducting state.

As a result of the above, the open circuit voltage at output B changes from a level near Vcc linearly to a level near zero volts, and output C has an open circuit voltage change from a level near zero volts linearly to a level near Vcc.

On return of the voltage at input A to its lower value the circuit changes state in a similar manner and reverts back to its previous state.

The waveforms are very nearly trapezoidal at outputs B and C for a rectangular wave signal at input A, except that there are no discontinuities during transition between the linear ramp portions and fixed level portions. This is achievd by the non-linear diode characteristics of the transistors. The degree of 'smoothness' is controlled by the maximum collector current levels in transistors T1 and T2, T3 and T4, defined by the values of resistors R1, R5, R6.

High maximum collector currents will cause sharp transitions in the output waveforms. However if the maximum collector currents are too low the voltages developed across the base-emitter junctions and subsequent base currents will cause a. a 'bounce' or signal irregularities to appear in the output waveform at the transition portion between the fixed level portions and the ramp portions of the waveform b. transistors T5 to T8 to come out of saturation (and hence an uncontrolled waveform) if the outputs (B and C) are heavily loaded.

It will be appreciated that if the output load current demand becomes excessive, for example due to short circuiting of the transmission lines, the base currents supplied to transistors T5 and T8 by transistor T3 and the base currents supplied to transistors T6 and T7 by transistor T4 limit the load currents to sensible values.

To reduce the high frequency response of the circuit a capacitor C2 is connected between the collector of transistor T2 and ground.

To reduce cross-over distortion between the outputs B and C, capacitors C3 to C6 are provided connected.

To provide temperature compensation in the circuit, diodes D1 to D4 are connected in series with resistors R7 to R10 respectively.

Figure 3:
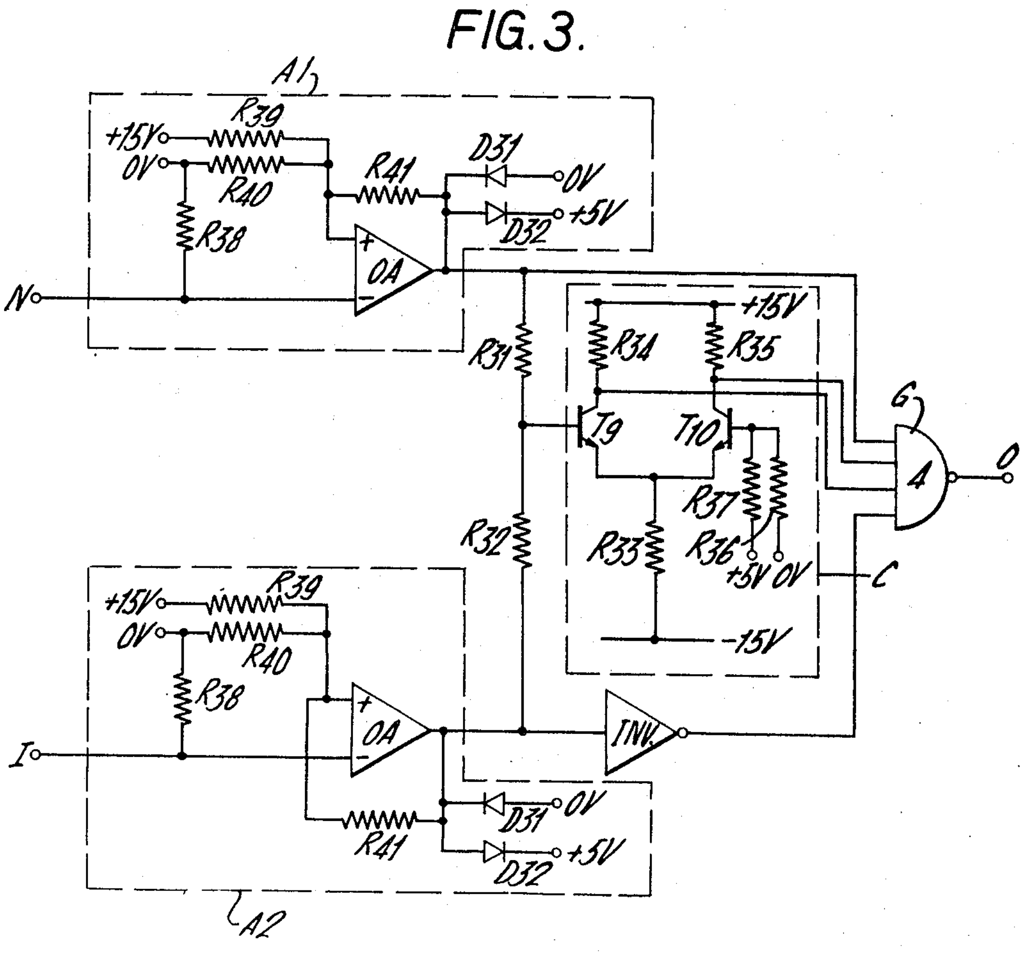
FIG. 3 is a circuit diagram of a line receiver for use in the system.

A suitable circuit for the line receiver 4 of FIG. 1 is shown in FIG. 3. In this circuit the inputs N and I are respectively connected to the inputs of two identical amplifier arrangements A1 and A2. The output of the amplifier arrangement A1 is directly connected to a first input of a four input NAND gate G, and the output of the amplifier arrangement A2 is connected via an inverter INV to a second input of the gate G. The other two inputs of the gate G are derived from a comparator C. The output of the NAND gate G constitutes the output O of the receiver.

Figure 4:
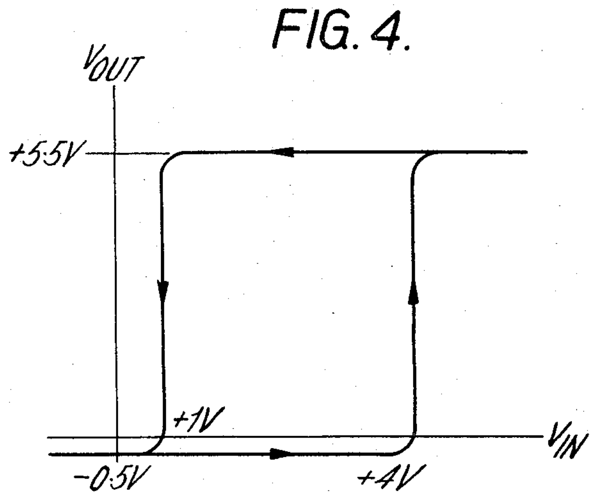
FIG. 4 illustrates the operation of part of the receiver shown in FIG. 3.

Each of the amplifier arrangements A1 and A2 has a high input impedance and a square hysteresis type input/output characteristic of the form illustrated in FIG. 4. The lower and upper input thresholds of the arrangements A1 and A2 are set respectively above and below the normal lower and upper voltage levels of the input signals at the terminals N and I in operation. Consequently, the arrangements A1 and A2 both produce signals of rectangular waveform at their output in response to the input signals of trapezoidal waveform.

Thus, in normal operation the inputs to the gate G from the amplifier arrangements are either both a logic '0' or a logic '1', and the output of the gate is either a logic '1' or a logic '0', being '1' when the signal at input N is a logic '1'.

The comparator C is arranged to produce a '0' at one or other of its outputs, thereby to inhibit the gate G, whenever the outputs of the amplifier arrangements A1 and A2 are other than complementary with respect to a reference potential.

In a typical arrangement the input thresholds of the amplifier arrangements A1 and A2 are set at 1 volt and 4 volts, and the output levels of the arrangements are set at approximately 5.5 volts and −0.5 volts. The input to the comparator C is conveniently derived from the junction between two equal resistors R31 and R32 connected in series between the outputs of the amplifier arrangements A1 and A2, the comparator C being set to detect a change in its input from a value of 2.5 volts. To this end as shown in FIG. 3 the comparator C suitably comprises a pair of NPN transistors T9 and T10 connected with a common emitter resistor R33 and separate equal collector resistors R34 and R35 between lines maintained at +15 volts and −15 volts respectively, the base of one of the transistors (T9) being connected to the junction between resistors R31 and R32 and the base of the other transistor T10 being connected to a source of reference potential of value 2.5 volts. The reference potential is conveniently derived from the junction of of two resistors R36 and R37 connected in series across a +5 volts supply.

It will be appreciated that the receiver of FIG. 3 has a large degree of immunity to electrically induced noise at its input terminals N and I, either in the form of a common mode noise signals, or differential mode noise signals. With the input thresholds of the amplifier arrangements set at 1 volt and 4 volts, the receiver has a noise rejection band of 3 volts.

A suitable circuit for the amplifier arrangements A1 and A2 is shown in FIG. 3. In this circuit the input N or I is connected to the inverting input of an operational amplifier OA which input is in turn connected to ground via a resistor R38. The non-inverting input of the amplifier OA is connected to the junction between two resistors R39 and R40 connected between ground and a line maintained at 15 volts positive with respect to ground. The output of the amplifier OA is connected to its noninverting input via a resistor R41, and diode clamps D31 and D32 are provided to restrict the voltage at the output of the amplifier OA to within limits acceptable by the subsequent circuit elements.

Figure 5:
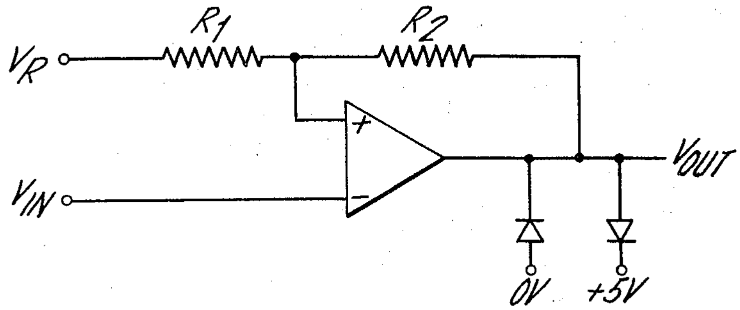
FIG. 5 is an equivalent circuit which may be utilised in design of part of the receiver of FIG. 3.

For design purposes each of the amplifying arrangements may be considered to be of the form shown in FIG. 5 for which the following equation holds:

$$V_{TH}/V_R - V_{OUT} = R_1/R_1 + R_2 \quad (1)$$

For the specific numerical input thresholds and output levels given above, by way of example, equation (1) becomes $$4/V_R - 5.5\ V = R_2/R_1 + R_2 \quad (2)$$

for the case when the input threshold is +4 volts and the output level is +5.5 volts; and $$1/V_R + 0.5 = R_2/R_1 + R_2 \quad (3)$$

for the case when the input threshold is +1 volt and the output level is −0.5 volt.

From equations (2) and (3) $V_R$ can be calculated. A value for the combination of $(R_1 + R_2)$ is then chosen and this enables $R_1$ and $R_2$ to be calculated from equations (1) and (2).

What we claim is:

1. A data transmission system comprising:

a. a source of binary data signals of substantially rectangular waveform;

b. a line driver circuit having a single input to which the output of the signal source is connected and having first and second outputs at which complementary output signals of trapezoidal waveform are developed in response to a signal of substantially rectangular waveform at said input;

c. a balanced pair transmission line having a pair of inputs respectively connected to said first and second outputs of said line driver circuit, and having a pair of outputs; and d. a line receiver circuit having first and second inputs respectively connected to said pair of outputs of said transmission line; and having an output at which a signal of substantially rectangular waveform is developed in response to signals of trapezoidal waveform at said first and second inputs.

2. A data transmission system according to claim 1 wherein said driver circuit comprises a constant current source connected with said input so as to be active in one state only of the signal produced by said binary data signal source, and a capacitor connected with said current source to integrate the constant current and thereby produce an output current of trapezoidal waveform, and means for producing said complementary output signals of trapezoidal waveform in response to said output current.

3. A transmission system according to claim 2 wherein said means for producing said complementary signals comprises: a first complementary pair of transistors to whose bases are supplied potentials which vary with said output current of trapezoidal waveform and whose emitter-collector paths are connected across a supply voltage via respective collector and emitter circuit impedances; a second compplementary pair of transistors whose emitter-collector paths are connected in series across said supply voltage; a third complementary pair of transistors whose emitter-collector paths are connected in series across said supply voltage; a connection between the emitter of each of said first pair of transistors and the base of the transistor of said second pair of corresponding type; and a connection between the collector of each of said first pair of transistors and the base of the transistor of said third pair of opposite type; said first and second outputs being derived from the junction between said second pair of transistors and the junction between said third pair of transistors respectively.

4. A transmission system according to claim 3 wherein a respective temperature compensating diode is connected in series with each of said emitter and collector circuit impedances of said first pair of transistors.

5. A transmission system according to claim 2 wherein said line receiver circuit comprises first and second amplifying arrangements which exhibit hysteresis type input/output characteristics and whose inputs are respectively connected to said first and second inputs of the circuit; and a logic gate via which the outputs of the amplifying arrangements are connected to the output of the circuit.

6. A transmission system according to claim 5 wherein said line receiver circuit includes a comparator whose output is connected to at least one further input of said gate and whose input is connected with the outputs of said amplifying arrangements so as to inhibit said gate when the outputs of the amplifying arrangements are other than complementary with respect to a reference potential.

7. A transmission system according to claim 6 wherein said comparator comprises a pair of transistors, a common emitter resistor connected with said transistors; separate collector resistors connected with said transistors; a connection between the base of one of the transistors and a point on a potential divider connected between the outputs of the amplifying arrangements; and a connection between the base of the other transistor and a source of said reference potential.

8. A transmission system according to claim 7 wherein each said amplifying arrangement comprises an operational amplifier having an inverting input and a non-inverting input; a connection between one of said inputs and a respective one of the inputs of the circuit; a resistance connected between said one input and ground, a resistance connected between the output of the operational amplifier and the other input of the operational amplifier; and a connection between said other input of the operational amplifier and junction between two resistances connected in series between a positive potential source and ground.

* * * * *